US012780961B2

(12) United States Patent
Henry et al.

(10) Patent No.: US 12,780,961 B2

(45) Date of Patent: Nov. 3, 2026

(54) PROCESS TO PRODUCE A POLYETHENE COMPOSITION FOR ORIENTED POLYETHYLENE FILM, POLYETHYLENE COMPOSITION AND FILM THEREOF

(71) Applicant: TOTALENERGIES ONETECH, Courbevoie (FR)

(72) Inventors: Gaetan Henry, Bovesse (BE); Kaitie Giffin, Seneffe (BE); Armelle Sigwald, Nivelles (BE); Christian Penu, Seneffe (BE)

(73) Assignee: TOTALENERGIES ONETECH, Courbevoie (FR)

( * ) Notice: Subject to any disclaimer, the term of this patent is extended or adjusted under 35 U.S.C. 154(b) by 46 days.

(21) Appl. No.: 18/881,393

(22) PCT Filed: Jul. 7, 2023

(86) PCT No.: PCT/EP2023/068856

§ 371 (c)(1),
(2) Date: Jan. 6, 2025

(87) PCT Pub. No.: WO2024/013014

PCT Pub. Date: Jan. 18, 2024

(65) Prior Publication Data

US 2025/0388708 A1 Dec. 25, 2025

(30) Foreign Application Priority Data

Jul. 11, 2022 (EP) .................................... 22315140

(51) Int. Cl.
*C08F 10/02* (2006.01)

(52) U.S. Cl.
CPC .................................... *C08F 10/02* (2013.01)

(58) Field of Classification Search
USPC .......................................................... 528/396
See application file for complete search history.

(56) References Cited

FOREIGN PATENT DOCUMENTS

| | | | | |
|---|---|---|---|---|
| CN | 105524338 A * | 4/2016 | | |
| CN | 111344341 A | 6/2020 | | |
| EP | 1299470 B1 * | 8/2007 | ............ | B32B 27/32 |
| EP | 1299470 A1 | 4/2023 | | |

OTHER PUBLICATIONS

CN-105524338-A Machine Translation (Year: 2016).*

English translation of Office Communication issued in Chinese Patent Application No. 202380047244.2, dated Mar. 28, 2025.

PCT International Preliminary Report on Patentability (Chapter II of the Patent Cooperation Treaty) issued in International Application No. PCT/EP2023/068856, dated Jul. 6, 2024.

PCT International Search Report and Written Opinion issued in International Application No. PCT/EP2023/068856, dated Aug. 4, 2023.

* cited by examiner

*Primary Examiner* — Terressa Boykin

(74) *Attorney, Agent, or Firm* — NORTON ROSE FULBRIGHT US LLP

(57) ABSTRACT

A process to produce a polyethene composition for oriented film comprising providing from 60 to 90 wt. % of a linear low-density polyethylene resin; with an MI2 ranging from 0.9 to 4.0 g/10 min; a density ranging from 0.910 to 0.930 g/cm3; an Mw/Mn of at least 2.5; a z average molecular weight (Mz) of at most 310,000 g/mol; and is a copolymer of ethylene and one or more comonomers wherein the one or more comonomers are present at a content ranging from 7.0 to 11.0 wt. % based on the linear low-density polyethylene resin; providing from 10 to 40 wt. % of a high-density polyethylene resin; with an MI2 ranging from 0.5 to 1.6 g/10 min; a density ranging from 0.950 to 0.965 g/cm3; and melt-blending the linear low-density polyethylene resin and the high-density polyethylene resin to produce a polyethylene composition.

20 Claims, 1 Drawing Sheet

PROCESS TO PRODUCE A POLYETHENE COMPOSITION FOR ORIENTED POLYETHYLENE FILM, POLYETHYLENE COMPOSITION AND FILM THEREOF

CROSS-REFERENCE TO RELATED APPLICATIONS

This application is a national phase application under 35 U.S.C. § 371 of International Application No. PCT/EP2023/068856, filed Jul. 7, 2023, which claims priority to European Patent Application No. 22315140.8, filed Jul. 11, 2022. The contents of the referenced applications are incorporated into the present application by reference.

TECHNICAL FIELD

The present disclosure relates to polyethylene compositions and articles made from such polyethylene compositions, such as oriented films (i.e., biaxially-oriented polyethylene film or mono-oriented polyethylene film). The present disclosure also relates to the process to produce said polyethylene composition.

TECHNICAL BACKGROUND

Polyethylene compositions comprising linear low-density polyethylene (LLDPE) to produce oriented films are known from the prior art.

For example, U.S. Pat. No. 8,247,065 discloses blends of linear low-density polyethylene (LLDPE) copolymers with very low density, low density, medium density, high density (HDPE), and differentiated polyethylenes and other polymers. This document disclosed the use of a metallocene-catalyzed LLDPE in such blends wherein the LLDPE preferably has a comonomer content of up to about 5 mol %; an MI2 ranging from 0.1 to 300 g/10 min; a melt index ratio from 15 to 45, an Mw from 20,000 to 200,000 g/mol, an Mw/Mn ranging from 2.0 to 4.5, an Mz/Mw ranging from 1.7 to 3.5 and a density ranging from 0.910 to 0.955 g/cm3. Also disclosed are LLDPE-HDPE blends wherein the HDPE can be present at a content ranging from 0.1 to 99.9 wt. %. In examples 63-84 of U.S. Pat. No. 8,247,065, the content of the HDPE was 10 wt. %. The HDPE resins used were produced from a traditional metallocene catalyst with a narrow MWD and were homopolymers with melt indexes ranging from 1 up to 200 g/10 min. Films produced from these blends were also produced. They showed an interesting balance of properties but there is still a need for improvement of the said balance of properties. For example, the optical properties or the impact resistance properties could be improved. Also, this document is silent regarding the sealing properties such as hot tack.

The present disclosure aims to provide a solution to one or more of the aforementioned drawbacks and problems. In particular, the present disclosure provides a polyethylene composition for oriented films, as well as a process to produce such a polyethylene composition, that allows obtaining an improved balance of properties comprising mechanical properties (such as stiffness or impact resistance), processability, optical properties, and sealing properties (such as hot tack properties) in comparison with non-oriented PE films.

SUMMARY

Surprisingly, it has been found that the above objectives can be attained either individually or in any combination, by the use of a specific polyethylene composition in a biaxially-oriented polyethylene (BOPE) film or mono-oriented polyethylene (MDO) film.

According to a first aspect, the disclosure provides a process to produce a polyethene composition for biaxially-oriented polyethylene film or mono-oriented polyethylene film, remarkable in that it comprises:

- providing from 60 to 90 wt. % of a linear low-density polyethylene resin based on the total weight of the polyethylene composition; wherein the linear low-density polyethylene resin has an MI2 ranging from 0.9 to 4.0 g/10 min as determined according to ISO 1133-2005 at 190° C. under a load of 2.16 kg; a density ranging from 0.910 to 0.930 g/cm$^3$ as determined according to ISO 1183-1:2012 at 23° C.; an Mw/Mn of at least 2.5 as determined by gel permeation chromatography; a z average molecular weight (Mz) of at most 310,000 g/mol as determined by gel permeation chromatography; and is a copolymer of ethylene and one or more comonomers wherein the one or more comonomers are present at a content ranging from 7.0 to 11.0 wt. % based on the linear low-density polyethylene resin;
- providing from 10 to 40 wt. % of a high-density polyethylene resin based on the total weight of the polyethylene composition; wherein the high-density polyethylene resin has an MI2 ranging from 0.5 to 1.6 g/10 min as determined according to ISO 1133-2005 at 190° C. under a load of 2.16 kg; a density ranging from 0.950 to 0.965 g/cm$^3$ as determined according to ISO 1183-1:2012 at 23° C., wherein the high-density polyethylene resin is selected to have an MI2 that is below or equal to the MI2 of the linear low-density polyethylene resin; and
- melt-blending the linear low-density polyethylene resin and the high-density polyethylene resin to produce a polyethylene composition.

In an embodiment, the process comprises providing from 65 to 85 wt. % of the linear low-density polyethylene resin based on the total weight of the polyethene composition.

In an embodiment, the process comprises providing from 15 to 35 wt. % of the high-density polyethylene resin based on the total weight of the polyethene composition.

One or more of the following can be used to further define the linear low-density polyethylene resin (LLDPE).

For example, the LLDPE is a copolymer of ethylene and one or more comonomers selected from propylene, 1-butene, 1-hexene; and 1-octene; preferably from 1-butene, 1-hexene; and 1-octene.

For example, the LLDPE is a copolymer of ethylene and one or more comonomers wherein the one or more comonomers are present at a content ranging from 7.5 to 9.5 wt. % based on the linear low-density polyethylene resin.

For example, the LLDPE has an MI2 ranging from 1.0 to 3.5 g/10 min as determined according to ISO 1133-2005 at 190° C. under a load of 2.16 kg.

For example, the LLDPE has a density ranging from 0.912 to 0.928 g/cm$^3$ as determined according to ISO 1183-1:2012 at 23° C.

For example, the LLDPE has an Mw/Mn ranging from 3.5 to 6.0 as determined by gel permeation chromatography.

For example, the LLDPE has a z average molecular weight (Mz) ranging from 180,000 to 280,000 g/mol as determined by gel permeation chromatography.

For example, the LLDPE is metallocene catalyzed.

For example, the LLDPE has a bimodal molecular weight distribution.

One or more of the following can be used to further define the high-density polyethylene resin (HDPE).

For example, the HDPE has an MI2 ranging from 0.6 to 1.5 g/10 min as determined according to ISO 1133-2005 at 190° C. under a load of 2.16 kg.

For example, the HDPE has a density ranging from 0.952 to 0.964 g/cm$^3$ as determined according to ISO 1183-1:2012 at 23° C.

According to a second aspect, the disclosure provides a polyethylene composition remarkable in that it is produced from the process according to the first aspect.

According to a third aspect, the disclosure provides a polyethylene composition remarkable in that it has:

- an MI2 ranging from 0.9 to 3.0 g/10 min as determined according to ISO 1133-2005 at 190° C. under a load of 2.16 kg;
- a density ranging from 0.915 to 0.935 g/cm$^3$ as determined according to ISO 1183-1:2012 at 23° C.:
- an Mw/Mn ranging from 3.0 to 6.0 as determined by gel permeation chromatography;
- a z average molecular weight (Mz) of at most 370,000 g/mol as determined by gel permeation chromatography;
- a main elution peak below 85° C. and a secondary elution peak above 95° C. in a TREF profile; and
- a comonomer content ranging from 4.2 to 9.1 wt. % based on the total weight of the polyethylene composition as determined by $^{13}$C-NMR analysis According to a third aspect, the disclosure provides a film being a single-layer film or a multi-layered film, remarkable in that the layer or at least one of the layers is made of the polyethylene composition according to the second aspect or to the third aspect; and in that the film is a biaxially-oriented polyethylene film or a mono-oriented polyethylene film.

The following can be used to further define the polyethylene composition according to the first, second or third aspect or used in the film according to the fourth aspect.

With preference, the polyethylene composition has

- an MI2 ranging from 0.9 to 3.0 g/10 min as determined according to ISO 1133-2005 at 190° C. under a load of 2.16 kg;
- a density ranging from 0.915 to 0.935 g/cm$^3$ as determined according to ISO 1183-1:2012 at 23° C.;
- an Mw/Mn ranging from 3.0 to 6.0 as determined by gel permeation chromatography;
- a z average molecular weight (Mz) of at most 370,000 g/mol as determined by gel permeation chromatography;
- a main elution peak below 85° C. and a secondary elution peak above 95° C. in a TREF profile; and
- a comonomer content ranging from 4.2 to 9.1 wt. % based on the total weight of the polyethylene composition as determined by $^{13}$C-NMR analysis.

For example, the polyethylene composition has an MI2 ranging from 1.0 to 2.6 g/10 min as determined according to ISO 1133-2005 at 190° C. under a load of 2.16 kg.

For example, the polyethylene composition has a density ranging from 0.920 to 0.935 g/cm$^3$ as determined according to ISO 1183-1:2012 at 23° C.

For example, the polyethylene composition has a comonomer content ranging from 4.9 to 8.5 wt. % based on the total weight of the polyethylene composition as determined by $^{13}$C-NMR analysis.

For example, the polyethylene composition has a main melting temperature peak Tm of at least 120° C. as determined according to ISO 11357-3:2018.

For example, the polyethylene composition has two elution peaks from 60 to 120° C. in a TREF profile.

For example, the polyethylene composition has a main elution peak below 85° C. and a secondary elution peak above 95° C. in a TREF profile.

For example, the polyethylene composition has from 60 to 90 wt. % based on the total weight of the polymer eluting at a temperature ranging from 50 to 95° C. and from 10 to 40 wt. % of the polymer eluting at a temperature ranging from above 95 to 120° C.

For example, the polyethylene composition has an Mw/Mn ranging from 3.2 to 5.8 as determined by gel permeation chromatography.

For example, the polyethylene composition has an Mz/Mw ranging from 2.0 to 5.0 as determined by gel permeation chromatography.

For example, the polyethylene composition has a z average molecular weight (Mz) of at most 350,000 g/mol as determined by gel permeation chromatography.

According to a fifth aspect, the disclosure provides a process to produce a biaxially-oriented polyethylene film according to the fourth aspect, comprising:

a) producing a polyethylene composition having:
   - an MI2 ranging from 0.9 to 3.0 g/10 min as determined according to ISO 1133-2005 at 190° C. under a load of 2.16 kg;
   - a density ranging from 0.915 to 0.935 g/cm$^3$ as determined according to ISO 1183-1:2012 at 23° C.:
   - an Mw/Mn ranging from 3.0 to 6.0 as determined by gel permeation chromatography;
   - a z average molecular weight (Mz) of at most 370,000 g/mol as determined by gel permeation chromatography;
   - a main elution peak below 85° C. and a secondary elution peak above 95° C. in a TREF profile; and
   - a comonomer content ranging from 4.2 to 9.1 wt. % based on the total weight of the polyethylene composition as determined by $^{13}$C-NMR analysis.

b) extruding or casting a film comprising the polyethylene composition c) stretching the film in a machine direction and in a transverse direction to produce a biaxially-oriented polyethylene film wherein stretching in the machine direction is at a stretch ratio from 4.5 to 7.0 and stretching in the transverse direction is at a stretch ratio in the range from 6.0 to 10.0; with preference, stretching in the machine direction is at a stretch ratio from 5.0 to 6.0 and/or stretching in the transverse direction is at a stretch ratio in the range from 7.5 to 9.5.

In an embodiment, step b) comprises extruding or casting a film having a thickness ranging from 500 μm to 1.5 mm as determined by DIN ISO 4593:1993.

In an embodiment, stretching the film in a machine direction and a transverse direction is performed by sequential stretching, wherein stretching is performed in the machine direction followed by stretching in the transverse direction.

In an embodiment, stretching the film in a machine direction and a transverse direction is performed by simultaneous stretching in both directions.

DETAILED DESCRIPTION

Figure 1:
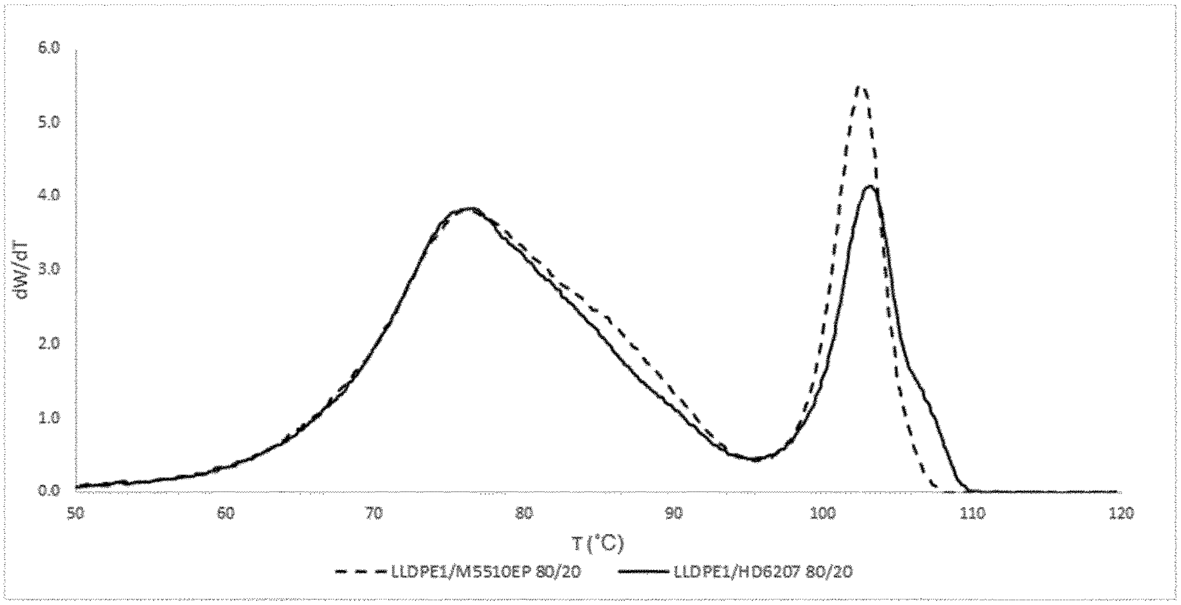
FIG. 1 represents a graph plotting the TREF (temperature rising elution fractionation) of a polyethylene composition according to the disclosure.

When describing the polymers, uses and processes of the disclosure, the terms employed are to be construed by the following definitions, unless a context dictates otherwise. For the disclosure, the following definitions are given:

As used herein, the singular forms “a”, “an”, and “the” include both singular and plural referents unless the context dictates otherwise. By way of example, “a resin” means one resin or more than one resin.

The terms “comprising”, “comprises” and “comprised of” as used herein are synonymous with “including”, “includes” or “containing”, “contains”, and are inclusive or open-ended and do not exclude additional, non-recited members, elements or method steps. It will be appreciated that the terms “comprising”, “comprises” and “comprised of” as used herein comprise the terms “consisting of”, “consists” and “consists of”.

The recitation of numerical ranges by endpoints includes all integer numbers and, where appropriate, fractions subsumed within that range (e.g., 1 to 5 can include 1, 2, 3, 4, 5 when referring to, for example, a number of elements, and can also include 1.5, 2, 2.75 and 3.80, when referring to, for example, measurements). The recitation of end points also includes the endpoint values themselves (e.g., from 1.0 to 5.0 includes both 1.0 and 5.0). Any numerical range recited herein is intended to include all sub-ranges subsumed therein.

All references cited in the present specification are hereby incorporated by reference in their entirety. In particular, the teachings of all references herein specifically referred to are incorporated by reference.

Reference throughout this specification to “one embodiment” or “an embodiment” means that a particular feature, structure or characteristic described in connection with the embodiment is included in at least one embodiment of the present disclosure. Thus, appearances of the phrases “in one embodiment” or “in an embodiment” in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the disclosure and form different embodiments, as would be understood by those in the art.

The terms “polyethylene” (PE) and “ethylene polymer” may be used synonymously. The term “polyethylene” encompasses ethylene homopolymer as well as ethylene copolymer resin which can be derived from ethylene and one or more comonomers selected from the group consisting of $C_3$-$C_{20}$ alpha-olefins, such as propylene, 1-butene, 1-pentene, 4-methyl-1-pentene, 1-hexene, 1-octene, 1-decene, 1-dodecene, 1-tetradecene, 1-hexadecene, 1-octadecene and 1-eicosene.

The term “high-density polyethylene”, which may be abbreviated as “HDPE”, is generally used to denote polyethylene having a density of at least 0.940 g/cm$^3$ as determined according to ISO 1183-1:2012 at 23° C.

The terms “polyethylene resin”, “ethylene homopolymer resin” or “ethylene copolymer resin” refer to polyethylene fluff or powder that is extruded, and/or melted and/or pelletized and can be produced through compounding and homogenizing of the polyethylene resin as taught herein, for instance, with mixing and/or extruder equipment. As used herein, the term “polyethylene” may be used as a shorthand for “polyethylene resin”. The terms “fluff” or “powder” refer to polyethylene material with the hard catalyst particle at the core of each grain and is defined as the polymer material after it exits the polymerization reactor (or the final polymerization reactor in the case of multiple reactors connected in series).

Under normal production conditions in a production plant, it is expected that the melt index (MI2, HLMI, MI5) will be different for the fluff than for the polyethylene resin. Under normal production conditions in a production plant, it is expected that the density will be slightly different for the fluff than for the polyethylene resin. Unless otherwise indicated, density and melt index for the polyethylene resin refer to the density and melt index as measured on the polyethylene resin as defined above.

The disclosure provides for a process to produce a polyethene composition for biaxially-oriented polyethylene film or mono-oriented polyethylene film, remarkable in that it comprises:

- providing from 60 to 90 wt. % of a linear low-density polyethylene resin based on the total weight of the polyethylene composition; wherein the linear low-density polyethylene resin has an MI2 ranging from 0.9 to 4.0 g/10 min as determined according to ISO 1133-2005 at 190° C. under a load of 2.16 kg; a density ranging from 0.910 to 0.930 g/cm$^3$ as determined according to ISO 1183-1:2012 at 23° C.; an Mw/Mn of at least 2.5 as determined by gel permeation chromatography; a z average molecular weight (Mz) of at most 310,000 g/mol as determined by gel permeation chromatography; and is a copolymer of ethylene and one or more comonomers wherein the one or more comonomers are present at a content ranging from 7.0 to 11.0 wt. % based on the linear low-density polyethylene resin;
- providing from 10 to 40 wt. % of a high-density polyethylene resin based on the total weight of the polyethylene composition; wherein the high-density polyethylene resin has an MI2 ranging from 0.5 to 1.6 g/10 min as determined according to ISO 1133-2005 at 190° C. under a load of 2.16 kg; a density ranging from 0.950 to 0.965 g/cm$^3$ as determined according to ISO 1183-1:2012 at 23° C., wherein the high-density polyethylene resin is selected to have an MI2 that is below or equal to the MI2 of the linear low-density polyethylene resin; and
- melt-blending the linear low-density polyethylene resin and the high-density polyethylene resin to produce a polyethylene composition.

In a preferred embodiment; the process comprises providing from 62 to 88 wt. % of the linear low-density polyethylene resin based on the total weight of the polyethylene composition; preferably from 65 to 85 wt. %; more preferably from 68 to 82 wt. %; and even more preferably from 70 to 80 wt. %.

In a preferred embodiment; the process comprises providing from 12 to 38 wt. % of the linear low-density polyethylene resin based on the total weight of the polyethylene composition; preferably from 15 to 35 wt. %; more preferably from 18 to 32 wt. %; and even more preferably from 20 to 30 wt. %.

The present disclosure also provides the disclosure provides a process to produce a biaxially-oriented polyethylene film, comprising a) producing a polyethylene composition having:
   an MI2 ranging from 0.9 to 3.0 g/10 min as determined according to ISO 1133-2005 at 190° C. under a load of 2.16 kg;
   a density ranging from 0.915 to 0.935 g/cm$^3$ as determined according to ISO 1183-1:2012 at 23° C.:
   an Mw/Mn ranging from 3.0 to 6.0 as determined by gel permeation chromatography;
   a z average molecular weight (Mz) of at most 370,000 g/mol as determined by gel permeation chromatography;
   a main elution peak below 85° C. and a secondary elution peak above 95° C. in a TREF profile; and
   a comonomer content ranging from 4.2 to 9.1 wt. % based on the total weight of the polyethylene composition as determined by $^{13}$C-NMR analysis.
b) extruding or casting a film comprising the polyethylene composition
c) stretching the film in a machine direction and in a transverse direction to produce a biaxially-oriented polyethylene film wherein stretching in the machine direction is at a stretch ratio from 4.5 to 7.0 and stretching in the transverse direction is at a stretch ratio in the range from 6.0 to 10.0; with preference, stretching in the machine direction is at a stretch ratio from 5.0 to 6.0 and/or stretching in the transverse direction is at a stretch ratio in the range from 7.5 to 9.5.

In an embodiment, step b) comprises extruding or casting a film having a thickness ranging from 500 μm to 1.5 mm as determined by DIN ISO 4593.

In an embodiment, stretching the film in a machine direction and a transverse direction is performed by sequential stretching, wherein stretching is performed in the machine direction followed by stretching in the transverse direction.

In an embodiment, stretching the film in a machine direction and a transverse direction is performed by simultaneous stretching in both directions.

Selection of the Linear Low-Density Polyethylene Resin

According to the present disclosure, the linear low-density polyethylene resin (LLDPE) is selected to have an MI2 ranging from 0.9 to 4.0 g/10 min as determined according to ISO 1133-2005 at 190° C. under a load of 2.16 kg; a density ranging from 0.910 to 0.930 g/cm$^3$ as determined according to ISO 1183-1:2012 at 23° C.; an Mw/Mn of at least 2.5 as determined by gel permeation chromatography; a z average molecular weight (Mz) of at most 310,000 g/mol as determined by gel permeation chromatography; and is a copolymer of ethylene and one or more comonomers wherein the one or more comonomers are present at a content ranging from 7.0 to 11.0 wt. % based on the linear low-density polyethylene resin.

For example, the linear low-density polyethylene resin is selected to have an MI2 of at least 0.9 g/10 min as determined according to ISO 1133-2005 at 190° C. under a load of 2.16 kg; preferably at least 1.0 g/10 min; more preferably of at least 1.1 g/10 min; even more preferably of at least 1.2 g/10 min; most preferably, of at least 1.3 g/10 min; and even most preferably, of at least 1.4 g/10 min.

For example, the linear low-density polyethylene resin is selected to have an MI2 of at most 4.0 g/10 min as determined according to ISO 1133-2005 at 190° C. under a load of 2.16 kg; preferably at most 3.8 g/10 min; more preferably at most 3.5 g/10 min; even more preferably of at most 3.2 g/10 min; most preferably of at most 3.0 g/10 min and even most preferably of at most 2.8 g/10 min or at most 2.5 g/10 min.

With preference, the linear low-density polyethylene resin is selected to have an MI2 ranging from 0.9 to 4.0 g/10 min as determined according to ISO 1133-2005 at 190° C. under a load of 2.16 kg; preferably from 0.9 to 3.8 g/10 min; more preferably from 1.0 to 3.5 g/10 min; even more preferably from 1.1 to 3.2 g/10 min; most preferably from 1.2 to 3.0 g/10 min and even most preferably from 1.3 to 2.8 g/10 min or from 1.4 to 2.5 g/10 min.

For example, the linear low-density polyethylene resin is selected to have a density of at least 0.910 g/cm$^3$ as determined according to ISO 1183-1:2012 at 23° C.; preferably, of at least 0.912 g/cm$^3$; more preferably, of at least 0.914 g/cm$^3$; even more preferably, of at least 0.915 g/cm$^3$; and most preferably of at least 0.916 g/cm$^3$.

For example, the linear low-density polyethylene resin is selected to have a density of at most 0.930 g/cm$^3$ as determined according to ISO 1183-1:2012 at 23° C.; preferably, of at most 0.928 g/cm$^3$; more preferably, of at most 0.925 g/cm$^3$; even more preferably, of at most 0.923 g/cm$^3$; and most preferably of at most 0.920 g/cm$^3$.

With preference, the linear low-density polyethylene resin is selected to have a density ranging from 0.910 to 0.930 g/cm$^3$ as determined according to ISO 1183-1:2012 at 23° C.; preferably, from 0.912 to 0.928 g/cm$^3$; more preferably, from 0.914 to 0.925 g/cm$^3$; even more preferably, from 0.915 to 0.923 g/cm$^3$; and most preferably from 0.916 to 0.920 g/cm$^3$.

The linear low-density polyethylene resin is preferably is a copolymer of ethylene and one or more comonomer. Suitable comonomers comprise but are not limited to aliphatic $C_3$-$C_{20}$ alpha-olefins. Examples of suitable aliphatic $C_3$-$C_{20}$ alpha-olefins include propylene, 1-butene, 1-pentene, 4-methyl-1-pentene, 1-hexene, 1-octene, 1-decene, 1-dodecene, 1-tetradecene, 1-hexadecene, 1-octadecene and 1-eicosene. With preference, the one or more comonomers are selected from propylene, 1-butene, 1-hexene, and 1-octene. With preference, the one or more comonomers are selected from propylene, 1-butene, and 1-hexene. More preferably the comonomer is 1-butene and/or 1-hexene.

The term “copolymer” refers to a polymer which is made by linking ethylene and at least one comonomer in the same polymer chain.

With preference, the linear low-density polyethylene is an ethylene copolymer and comprises at least 7.0 wt. % of the one or more comonomers based on the total weight of the linear low-density polyethylene resin as determined by $^{13}$C-NMR analysis; preferably at least 7.2 wt. %; more preferably at least 7.5 wt. %; even more preferably, at least 7.8 wt. % most preferably at least 8.0 wt. %; even most preferably at least 8.2 wt. %.

With preference, the linear low-density polyethylene is an ethylene copolymer and comprises at most 11.0 wt. % of the one or more comonomers based on the total weight of the linear low-density polyethylene resin as determined by $^{13}$C-NMR analysis; preferably at most 10.0 wt. %; preferably at most 9.5 wt. %; more preferably at most 9.0 wt. %; and even more preferably at most 8.8 wt. %.

In a preferred embodiment the one or more comonomers are present in the linear low-density polyethylene resin at a content ranging from 7.0 to 11.0 wt. % based on the total weight of the linear low-density polyethylene resin as determined by $^{13}$C-NMR analysis; preferably from 7.2 to 10.0 wt. %; more preferably; 7.5 to 9.5 wt. %; and even more preferably from 8.0 to 9.0 wt. %.

In an embodiment, the linear low-density polyethylene is metallocene-catalyzed.

In an embodiment, the linear low-density polyethylene resin has a multimodal or bimodal molecular weight distribution.

For example, the linear low-density polyethylene resin has an Mw/Mn of at least 2.5 as determined by gel permeation chromatography; preferably, of at least 2.7; preferably, of at least 3.0; preferably, of at least 3.2; preferably, of at least 3.5; preferably, of at least 3.6; more preferably, of at least 3.8; even more preferably of at least 4.0; most preferably of at least 4.2.

For example, the linear low-density polyethylene resin has an Mw/Mn of at most 6.0 as determined by gel permeation chromatography; preferably, of at most 5.8; more preferably, of at most 5.5; even more preferably of at most 5.2; most preferably of at most 5.0.

For example, the linear low-density polyethylene resin has an Mw/Mn ranging from 2.7 to 6.0 as determined by gel permeation chromatography; preferably ranging from 3.5 to 6.0; more preferably ranging from 4.0 to 5.0.

For example, the linear low-density polyethylene resin has a z average molecular weight (Mz) of at most 310,000 g/mol as determined by gel permeation chromatography; preferably of at most 300,000 g/mol; more preferably of at most 280,000 g/mol; and even more preferably of at most 260,000 g/mol.

For example, the linear low-density polyethylene resin has a z average molecular weight (Mz) of at least 160,000 g/mol as determined by gel permeation chromatography; preferably of at least 180,000 g/mol; more preferably of at least 200,000 g/mol; and even more preferably of at least 220,000 g/mol.

For example, the linear low-density polyethylene resin has a z average molecular weight (Mz) ranging from 160,000 to 310,000 g/mol as determined by gel permeation chromatography; preferably, from 180,000 to 280,000 g/mol.

For example, the linear low-density polyethylene resin has an Mw of at most 110,000 g/mol as determined by gel permeation chromatography; preferably, of at most 100,000 g/mol; more preferably, of at most 95,000 g/mol; and even more preferably of at most 90,000 g/mol.

For example, the linear low-density polyethylene resin has an Mw of at least 60,000 g/mol as determined by gel permeation chromatography; preferably, of at least 65,000 g/mol; more preferably, of at least 70,000 g/mol; and even more preferably of at least 75,000 g/mol.

Selection of the High-Density Polyethylene Resin

The high-density polyethylene resin has an MI2 ranging from 0.5 to 1.6 g/10 min as determined according to ISO 1133-2005 at 190° C. under a load of 2.16 kg and a density ranging from 0.950 to 0.965 g/cm$^3$ as determined according to ISO 1183-1:2012 at 23° C.

For example, the high-density polyethylene resin is selected to have an MI2 of at least 0.5 g/10 min as determined according to ISO 1133-2005 at 190° C. under a load of 2.16 kg; preferably of at least 0.6 g/10 min; more preferably of at least 0.7 g/10 min; even more preferably of at least 0.8 g/10 min.

For example, the high-density polyethylene resin is selected to have an MI2 of at most 1.6 g/10 min as determined according to ISO 1133-2005 at 190° C. under a load of 2.16 kg; preferably at most 1.5 g/10 min; more preferably at most 1.4 g/10 min; even more preferably of at most 1.3 g/10 min.

With preference, the high-density polyethylene resin is selected to have an MI2 ranging from 0.5 to 1.6 g/10 min as determined according to ISO 1133-2005 at 190° C. under a load of 2.16 kg; preferably from 0.6 to 1.5 g/10 min; more preferably from 0.7 to 1.4 g/10 min; even more preferably from 0.8 to 1.3 g/10 min.

For example, the high-density polyethylene resin is selected to have a density of at least 0.950 g/cm$^3$ as determined according to ISO 1183-1:2012 at 23° C.; preferably, of at least 0.952 g/cm$^3$; more preferably, of at least 0.954 g/cm$^3$; and even more preferably, of at least 0.955 g/cm$^3$.

For example, the high-density polyethylene resin is selected to have a density of at most 0.965 g/cm$^3$ as determined according to ISO 1183-1:2012 at 23° C.; preferably, of at most 0.964 g/cm$^3$; more preferably, of at most 0.962 g/cm$^3$; and even more preferably, of at most 0.960 g/cm$^3$.

With preference, the high-density polyethylene resin is selected to have a density ranging from 0.950 to 0.965 g/cm$^3$ as determined according to ISO 1183-1:2012 at 23° C.; preferably, from 0.952 to 0.964 g/cm$^3$; more preferably, from 0.954 to 0.962 g/cm$^3$; and even more preferably, from 0.955 to 0.960 g/cm$^3$.

The high-density polyethylene resin is selected from a homopolymer and a copolymer of ethylene and one or more comonomer; preferably a homopolymer.

Suitable comonomers comprise but are not limited to aliphatic $C_3$-$C_{20}$ alpha-olefins. Examples of suitable aliphatic $C_3$-$C_{20}$ alpha-olefins include propylene, 1-butene, 1-pentene, 4-methyl-1-pentene, 1-hexene, 1-octene, 1-decene, 1-dodecene, 1-tetradecene, 1-hexadecene, 1-octadecene and 1-eicosene. With preference, the one or more comonomers are selected from propylene, 1-butene, 1-hexene, and 1-octene. With preference, the one or more comonomers are selected from propylene, 1-butene, and 1-hexene. More preferably the comonomer is 1-butene and/or 1-hexene.

The term "copolymer" refers to a polymer which is made by linking ethylene and at least one comonomer in the same polymer chain. The term homopolymer refers to a polymer which is made in the absence of comonomer or with less than 0.1 wt %, more preferably less than 0.05 wt % of comonomer.

With preference, the high-density polyethylene is an ethylene copolymer and comprises at least 0.1 wt. % of the one or more comonomers based on the total weight of the high-density polyethylene, preferably at least 0.5 wt. %; more preferably at least 0.8 wt. %; even more preferably, at least 1.0 wt. % most preferably at least 1.2 wt. %; even most preferably at least 1.5 wt. % as determined by $^{13}$C-NMR analysis.

With preference, the high-density polyethylene is an ethylene copolymer and comprises at most 2.5 wt. % of the one or more comonomers based on the total weight of the high-density polyethylene as determined by $^{13}$C-NMR analysis; preferably at most 2.2 wt. %; more preferably at most 2.0 wt. %; and even more preferably at most 1.8 wt. %.

In a preferred embodiment the one or more comonomers are present in the high-density polyethylene at a content ranging from 0.1 to 2.5 wt. % based on the total weight of high-density polyethylene as determined by $^{13}$C-NMR analysis; preferably from 0.5 to 2.5 wt. %; more preferably; 0.8 to 2.2 wt. %; and even more preferably from 1.0 to 2.2 wt. %.

For example, the HDPE is Chromium-catalyzed, Ziegler-Natta catalyzed or metallocene catalyzed.

The Polyethylene Composition

With preference, the linear low-density polyethylene resin and the high-density polyethylene resin and their respective contents are selected to have a polyethylene composition having an MI2 ranging from 0.9 to 3.0 g/10 min as determined according to ISO 1133-2005 at 190° C. under a load of 2.16 kg and a density ranging from 0.915 to 0.935 g/cm$^3$ as determined according to ISO 1183-1:2012 at 23° C.; an Mw/Mn ranging from 3.0 to 6.0 as determined by gel permeation chromatography; a z average molecular weight (Mz) of at most 370,000 g/mol as determined by gel permeation chromatography; and a comonomer content ranging from 4.2 to 9.1 wt. % based on the total weight of the polyethylene composition as determined by $^{13}$C-NMR analysis.

For example, the polyethylene composition has an MI2 of at least 0.9 g/10 min as determined according to ISO 1133-2005 at 190° C. under a load of 2.16 kg; preferably at least 1.0 g/10 min; and more preferably of at least 1.1 g/10 min.

For example, the polyethylene composition has an MI2 of at most 3.0 g/10 min as determined according to ISO 1133-2005 at 190° C. under a load of 2.16 kg; preferably of at most 2.8 g/10 min; more preferably of at most 2.6 g/10 min; even more preferably of at most 2.4 g/10 min.

With preference, the polyethylene composition has an MI2 ranging from 0.9 to 3.0 g/10 min as determined according to ISO 1133-2005 at 190° C. under a load of 2.16 kg; preferably from 0.9 to 2.8 g/10 min; more preferably from 1.0 to 2.6 g/10 min; even more preferably from 1.1 to 2.4 g/10 min.

For example, the polyethylene composition has a density of at least 0.920 g/cm$^3$ as determined according to ISO 1183-1:2012 at 23° C.; preferably, of at least 0.922 g/cm$^3$; more preferably, of at least 0.924 g/cm$^3$; and even more preferably, of at least 0.925 g/cm$^3$.

For example, the polyethylene composition has a density of at most 0.935 g/cm$^3$ as determined according to ISO 1183-1:2012 at 23° C.; preferably, of at most 0.934 g/cm$^3$; more preferably, of at most 0.932 g/cm$^3$; and even more preferably, of at most 0.930 g/cm$^3$.

With preference, the polyethylene composition has a density ranging from 0.915 to 0.935 g/cm$^3$ as determined according to ISO 1183-1:2012 at 23° C.; preferably, from 0.920 to 0.934 g/cm$^3$; more preferably, from 0.924 to 0.932 g/cm$^3$; and even more preferably, from 0.925 to 0.930 g/cm$^3$.

With preference, the polyethylene composition comprises at least 4.2 wt. % of the one or more comonomers based on the total weight of the polyethylene composition as determined by $^{13}$C-NMR analysis, preferably at least 4.5 wt. %; more preferably at least 4.9 wt. %; even more preferably, at least 5.0 wt. % most preferably at least 5.2 wt. %; even most preferably at least 5.5 wt. % or at least 5.7 wt. %.

With preference, the polyethylene composition comprises at most 9.1 wt. % of the one or more comonomers based on the total weight of the polyethylene composition as determined by $^{13}$C-NMR analysis; preferably at most 8.5 wt. %; more preferably at most 7.5 wt. %; and even more preferably at most 6.5 wt. %.

In a preferred embodiment the one or more comonomers are present in the polyethylene composition at a content ranging from 4.2 to 9.1 wt. % based on the total weight of the polyethylene composition as determined by $^{13}$C-NMR analysis; preferably from 4.5 to 9.2 wt. %; more preferably; 4.9 to 8.5 wt. %; even more preferably from 5.0 to 7.5 wt. % and most preferably from 5.2 to 6.5 wt. %.

For example, the polyethylene composition has two elution peaks from 60 to 120° C. in a TREF profile, excluding purge.

For example, the polyethylene composition has a main elution peak below 85° C. in a TREF profile. With preference, the polyethylene composition has a main elution peak below 82° C. in a TREF profile, preferably below 80° C.

For example, the polyethylene composition has a secondary elution peak above 95° C. in a TREF profile. With preference, the polyethylene composition has a main elution peak above 98° C. in a TREF profile, preferably above 100° C.

For example, the polyethylene composition has from 60 to 90 wt. % based on the total weight of the polymer eluting at a temperature ranging from 50 to 95° C. and from 10 to 40 wt. % of the polymer eluting at a temperature ranging from above 95 to 120° C.; preferably, from 65 to 85 wt. % based on the total weight of the polymer eluting at a temperature ranging from 50 to 95° C. and from 15 to 35 wt. % of the polymer eluting at a temperature ranging from above 95 to 120° C.

For example, the polyethene composition has an Mw/Mn of at least 3.0 as determined by gel permeation chromatography; preferably, of at least 3.2; more preferably, of at least 3.5; even more preferably of at least 3.8; most preferably of at least 4.0.

For example, the polyethene composition has an Mw/Mn of at most 6.0 as determined by gel permeation chromatography; preferably, of at most 5.8; more preferably, of at most 5.5; even more preferably of at most 5.2; most preferably of at most 5.0.

For example, the polyethene composition has an Mw/Mn ranging from 3.0 to 6.0 as determined by gel permeation chromatography; preferably an Mw/Mn ranging from 4.0 to 5.0.

For example, the polyethene composition has a z average molecular weight (Mz) of at most 370,000 g/mol as determined by gel permeation chromatography; preferably, of at most 360,000 g/mol more preferably, of at most 350,000 g/mol; even more preferably of at 320,000 g/mol; and most preferably of at most 300,000 g/mol.

For example, the polyethene composition has a z average molecular weight (Mz) ranging from 180,000 to 370,000 g/mol as determined by gel permeation chromatography, preferably ranging from 200,000 to 350,000 g/mol.

For example, the polyethene composition has an Mz/Mw of at least 2.0 as determined by gel permeation chromatography; preferably, of at least 2.2; more preferably, of at least 2.5. For example, the polyethene composition has an Mz/Mw of at most 5.0 as determined by gel permeation chromatography; preferably of at 4.5; most preferably of at most 4.0; and even most preferably of at most 3.5. For example, the polyethene composition has an Mz/Mw ranging from 2.0 to 5.0 as determined by gel permeation chromatography; preferably, Mz/Mw ranging from 2.2 to 4.0.

For example, the polyethene composition has a main melting temperature peak Tm of at least 120° C. as determined according to ISO 11357-3:2018; preferably of at least 122° C., more preferably at least 124° C.

The polyethylene composition according to the disclosure may contain one or more additives such as, by way of example, antioxidants, light stabilizers, acid scavengers, flame retardants, lubricants, antistatic additives, nucleating/clarifying agents, colourants, slip agents, anti-blocking agents, processing aids and any mixture thereof. So producing a polyethylene composition may comprise blending the polyethylene with one or more additives to obtain a polyethylene composition.

For example, the polyethylene composition according to the disclosure may contain one or more antioxidants such as primary antioxidants and/or secondary antioxidants. It is believed that the one or more antioxidants do not influence the stretching behaviour, nor final film mechanical properties.

Typical commercial primary antioxidants are hindered phenols and secondary aromatic amines. The most common secondary antioxidants are trivalent phosphorus compounds (phosphites).

In a preferred embodiment, the polyethylene composition comprises from 100 to 5000 ppm of the one or more antioxidants based on the total weight of the polyethylene composition. With preference, the one or more antioxidants comprise at least one phenolic antioxidant and/or at least one organic phosphite or phosphonite antioxidant.

With preference, the polyethylene composition comprises at least 100 ppm of the one or more antioxidants based on the total weight of the polyethylene composition; preferably at least 150 ppm, more preferably at least 200 ppm; even more preferably at least 250 ppm and most preferably at least 300 ppm.

With preference, the polyethylene composition comprises at most 5000 ppm of the one or more antioxidants based on the total weight of the polyethylene composition; preferably at most 4000 ppm, more preferably at most 3000 ppm; even more preferably at most 2500 ppm and most preferably at most 2000 ppm.

With preference, the polyethylene composition comprises from 100 to 5000 ppm of the one or more antioxidants based on the total weight of the polyethylene composition; preferably from 150 to 4000 ppm; more preferably from 200 to 3000 ppm; even more preferably from 250 to 2500 ppm; and most preferably from 300 to 2000 ppm.

In preferred embodiments, the one or more antioxidants are or comprise one or more phenolic antioxidants selected from octadecyl 3-(3,5-di-t-butyl-4-hydroxyphenyl)propionate (CAS number 2082-79-3, Irganox® 1076) and/or pentaerythritol-tetrakis(3-(3',5'-di-t-butyl-4-hydroxyphenyl) propionate (CAS 6683-19-8, Irganox® 1010).

With preference, the polyethylene composition comprises at least 100 ppm of one or more phenolic antioxidants based on the total weight of the polyethylene composition; preferably at least 150 ppm, more preferably at least 200 ppm; even more preferably at least 250 ppm and most preferably at least 300 ppm.

With preference, the polyethylene composition comprises at most 5000 ppm of one or more phenolic antioxidants based on the total weight of the polyethylene composition; preferably at most 4000 ppm, more preferably at most 3000 ppm; even more preferably at most 2500 ppm and most preferably at most 2000 ppm.

The polyethylene composition comprises from 100 to 5000 ppm based on the total weight of the polyethylene composition of one or more phenolic antioxidants selected from octadecyl 3-(3',5'-di-t-butyl-4-hydroxyphenyl)propionate and/or pentaerythritol-tetrakis(3-(3',5'-di-t-butyl-4-hydroxyphenyl)propionate; preferably from 150 to 4000 ppm; more preferably from 200 to 3000 ppm; even more preferably from 250 to 2500 ppm; and most preferably from 300 to 2000 ppm.

In preferred embodiments, the one or more antioxidants are or comprise at least one organic phosphite or phosphonite antioxidant selected from tris(2,4-ditert-butylphenyl) phosphite (CAS number 31570-04-4, Irgafos® 168), bis(2,4-di-tert.-butyl-6-methylphenyl)-ethyl-phosphite (CAS number 145650-60-8, Irgafos® 38), tris-nonylphenyl phosphite (CAS number 26523-78-4), tetrakis-(2,4-di-t-butylphenyl)-4,4'-biphenyl-di-phosphonite (CAS number 119345-01-6, Irgafos® P-EPQ), 2,4,6-tri-tert-butylphenyl 2-butyl-2-ethyl-1,3-propanediol phosphite (CAS number 161717-32-4, Ultranox® 641) and any mixture thereof.

With preference, the polyethylene composition comprises at least 100 ppm of one or more organic phosphite or phosphonite antioxidants based on the total weight of the polyethylene composition; preferably at least 150 ppm, more preferably at least 200 ppm; even more preferably at least 250 ppm and most preferably at least 300 ppm.

With preference, the polyethylene composition comprises at most 5000 ppm of one or more organic phosphite or phosphonite antioxidants based on the total weight of the polyethylene composition; preferably at most 4000 ppm, more preferably at most 3000 ppm; even more preferably at most 2500 ppm and most preferably at most 2000 ppm.

The polyethylene composition comprises from 100 to 5000 ppm based on the total weight of the polyethylene composition of one or more organic phosphite or phosphonite antioxidants selected from tris(2,4-ditert-butylphenyl) phosphite (CAS number 31570-04-4, Irgafos® 168), bis(2,4-di-tert.-butyl-6-methylphenyl)-ethyl-phosphite (CAS number 145650-60-8, Irgafos® 38), tris-nonylphenyl phosphite (CAS number 26523-78-4), tetrakis-(2,4-di-t-butylphenyl)-4,4'-biphenyl-di-phosphonite (CAS number 119345-01-6, Irgafos® P-EPQ), 2,4,6-tri-tert-butylphenyl 2-butyl-2-ethyl-1,3-propanediol phosphite (CAS number 161717-32-4, Ultranox® 641), or a mixture thereof; preferably from 150 to 4000 ppm; more preferably from 200 to 3000 ppm; even more preferably from 250 to 2500 ppm; and most preferably from 300 to 2000 ppm.

In an embodiment, the one or more antioxidants comprise one or more selected from pentaerythritol tetrakis[3-(3',5'-di-tert-butyl-4'-hydroxyphenyl)propionate]; tris(2,4-ditert-butylphenyl) phosphite and/or octadecyl 3-(3,5-di-tert-butyl-4-hydroxyphenyl)propionate.

In an embodiment, the one or more antioxidants comprise at least two selected from pentaerythritol tetrakis[3-(3',5'-di-tert-butyl-4'-hydroxyphenyl)propionate], tris(2,4-ditert-butylphenyl) phosphite and octadecyl 3-(3,5-di-tert-butyl-4-hydroxyphenyl)propionate.

Pentaerythritol tetrakis[3-(3',5'-di-tert-butyl-4'-hydroxyphenyl)propionate] is commercially available as Irganox® 1010 by BASF. Tris(2,4-ditert-butylphenyl) phosphite is commercially available as Irgafos® 168 by BASF. Octadecyl 3-(3,5-di-tert-butyl-4-hydroxyphenyl)propionate is commercially available as Irganox® 1076 by BASF.

For example, the polyethylene composition according to the disclosure may contain one or more acid scavengers. It is believed that the one or more acid scavengers do not influence the stretching behaviour, nor the final film's mechanical properties.

With preference, the polyethylene composition comprises from 10 to 5000 ppm based on the total weight of the polyethylene composition of one or more acid scavengers; preferably from 50 to 4000 ppm; more preferably from 100 to 3000 ppm; even more preferably from 200 to 2500 ppm; and most preferably from 300 to 2000 ppm.

With preference, the one or more acid scavengers are selected from calcium oxide, zinc oxide, calcium stearate, magnesium stearate, zinc stearate, sodium stearate, potassium stearate, hydrotalcite and mixtures thereof, preferably selected from calcium stearate, magnesium stearate, zinc stearate, sodium stearate, potassium stearate, and mixtures thereof, more preferably selected from calcium stearate, calcium oxide, zinc oxide and any mixture thereof. With preference, the one or more acid scavengers are or comprise calcium stearate.

For example, the polyethylene composition may contain one or more slip agents. Any slip agent known to a person skilled in the art may be added. Non-limiting examples of the slip agents include primary amides having about 12 to about 40 carbon atoms (e.g., erucamide, oleamide, stearamide and behenamide); secondary amides having about 18 to about 80 carbon atoms (e.g., stearyl erucamide, behenyl erucamide, methyl erucamide and ethyl erucamide); secondary-bis-amides having about 18 to about 80 carbon atoms (e.g., ethylene-bis-stearamide and ethylene-bis-oleamide); and combinations thereof. For example, the one or more slip agents are selected from polymethylsiloxane, erucamide, oleamide, stearamide, behenamide, stearyl erucamide, behenyl erucamide, methyl erucamide, ethyl erucamide, ethylene-bis-stearamide, ethylene-bis-oleamide and any combination thereof. Non limiting examples of commercially available slip agents have a trade name such as ATMER™ SA from Uniqema, Everberg, Belgium; ARMOSLIP® from Akzo Nobel Polymer Chemicals, Chicago, IL; KEMAMIDE® from Witco, Greenwich, CT; and CRODAMIDE® from Croda, Edison, NJ.

With preference, the polyethylene composition comprises from 10 to 5000 ppm based on the total weight of the polyethylene composition of one or more slip agents; preferably from 50 to 4000 ppm; more preferably from 100 to 3000 ppm; even more preferably from 200 to 2500 ppm; and most preferably from 300 to 2000 ppm.

For example, the polyethylene composition may contain one or more anti-blocking agents. The anti-blocking agent can be used to prevent the undesirable adhesion between touching layers of articles made from the polymer compositions, particularly under moderate pressure and heat during storage, manufacture or use. Any anti-blocking agent known to a person of ordinary skill in the art may be added to the polyethylene compositions disclosed herein. Non-limiting examples of anti-blocking agents include minerals (e.g., clays, chalk, and calcium carbonate), synthetic silica gel (e.g., SYLOBLOC® from Grace Davison, Columbia, MD), natural silica (e.g., SUPER FLOSS® from Celite Corporation, Santa Barbara, CA), talc (e.g., OPTIBLOC® from Luzenac, Centennial, CO), zeolites (e.g., SIPERNAT® from Degussa, Parsippany, NJ), aluminosilicates (e.g., SILTON® from Mizusawa Industrial Chemicals, Tokyo, Japan), limestone (e.g., CARBOREX® from Omya, Atlanta, GA), spherical polymeric particles (e.g., EPOSTAR®, poly(methyl methacrylate) particles from Nippon Shokubai, Tokyo, Japan and TOSPEARL®, silicone particles from GE Silicones, Wilton, CT), waxes, amides (e.g. erucamide, oleamide, stearamide, behenamide, ethylene-bis-stearamide, ethylene-bis-oleamide, stearyl erucamide and other slip agents), molecular sieves, and combinations thereof.

With preference, the polyethylene composition comprises from 10 to 5000 ppm based on the total weight of the polyethylene composition of one or more anti-blocking agents; preferably from 50 to 4000 ppm; more preferably from 100 to 3000 ppm; even more preferably from 200 to 2500 ppm; and most preferably from 300 to 2000 ppm.

For example, the polyethylene composition may contain one or more processing aids. For example, the one or more processing aids are selected from fluoroelastomers, waxes, tristearin, zinc stearate, calcium stearate, magnesium stearate, erucyl amide, oleic acid amide, ethylene-acrylic acid copolymer, ethylene vinyl acetate copolymer, cetyl trimethyl ammonium bromide, polyethylene oxide, polysiloxanes, oleamide, stearamide, behenamide, oleyl palmitamide, ethylene bis-oleamide, ethylene bis(stearamide) (EBS) and any mixture thereof With preference, the polyethylene composition comprises from 10 to 5000 ppm based on the total weight of the polyethylene composition of one or more processing aids; preferably from 50 to 4000 ppm; more preferably from 100 to 3000 ppm; even more preferably from 200 to 2500 ppm; and most preferably from 300 to 2000 ppm.

Test Methods

The melt flow index MI2 of the polyethylene resin is determined according to ISO 1133-2005 at 190° C. under a load of 2.16 kg.

The HLMI of the polyethylene resin is determined according to ISO 1133-2005 at 190° C. under a load of 21.6 kg.

The Mn, Mw, Mz, Mw/Mn and Mz/Mw: The molecular weight $M_n$ (number average molecular weight), $M_w$ (weight average molecular weight) and molecular weight distributions D (Mw/Mn) were determined by size exclusion chromatography (SEC) and in particular by gel permeation chromatography (GPC). Briefly, a GPC-IR5 from Polymer Char was used: 10 mg polyethylene sample was dissolved at 160° C. in 10 ml of trichlorobenzene for 1 hour. Injection volume: about 400 µl, automatic sample preparation and injection temperature: 160° C. Column temperature: 145° C. Detector temperature: 160° C. Two Shodex AT-806 MS (Showa Denko) and one Styragel HT6E (Waters) columns were used with a flow rate of 1 ml/min. Detector: Infrared detector (2800-3000 $cm^{-1}$). Calibration: narrow standards of polystyrene (PS) (commercially available). Calculation of molecular weight Mi of each fraction i of eluted polyethylene is based on the Mark-Houwink relation ($\log_{10}(M_{PE})=0.965909\times\log_{10}(M_{PS})-0.28264$) (cut off on the low molecular weight end at $M_{PE}=1000$).

The molecular weight averages used in establishing molecular weight/property relationships are the number average ($M_n$), weight average ($M_w$) and z average ($M_z$) molecular weight. These averages are defined by the following expressions and are determined from the calculated $M_i$:

$$M_n=\frac{\sum_i N_iM_i}{\sum_i N_i}=\frac{\sum_i W_i}{\sum_i W_i/M_i}=\frac{\sum_i h_i}{\sum_i h_i/M_i}$$

$$M_w=\frac{\sum_i N_iM_i^2}{\sum_i N_iM_i}=\frac{\sum_i W_iM_i}{\sum_i W_i}=\frac{\sum_i h_iM_i}{\sum_i h_i}$$

$$M_z=\frac{\sum_i N_iM_i^3}{\sum_i N_iM_i^2}=\frac{\sum_i W_iM_i^2}{\sum_i W_iM_i}=\frac{\sum_i h_iM_i^2}{\sum_i h_iM_i}$$

Here $N_i$ and $W_i$ are the number and weight, respectively, of molecules having molecular weight Mi. The third representation in each case (farthest right) defines how one obtains these averages from SEC chromatograms. $h_i$ is the height (from baseline) of the SEC curve at the $i_{th}$ elution fraction and Mi is the molecular weight of species eluting at this increment.

The molecular weight distribution (MWD) is then calculated as $M_w/M_n$.

The $^{13}$C-NMR analysis is performed using a 400 MHz or 500 MHz Bruker NMR spectrometer under conditions such that the signal intensity in the spectrum is directly proportional to the total number of contributing carbon atoms in the sample. Such conditions are well-known to the skilled person and include, for example, sufficient relaxation time etc. In practice, the intensity of a signal is obtained from its integral, i.e., the corresponding area. The data are acquired using proton decoupling, 2000 to 4000 scans per spectrum with 10 mm room temperature through or 240 scans per spectrum with a 10 mm cryoprobe, a pulse repetition delay of 11 seconds and a spectral width of 25000 Hz (+/−3000 Hz). The sample is prepared by dissolving a sufficient amount of polymer in 1,2,4-trichlorobenzene (TCB, 99%, spectroscopic grade) at 130° C. and occasional agitation to homogenize the sample, followed by the addition of hexadeuterobenzene ($C_6D_6$, spectroscopic grade) and a minor amount of hexamethyldisiloxane (HMDS, 99.5+%), with HMDS serving as an internal standard. To give an example, about 200 mg to 600 mg of polymer is dissolved in 2.0 mL of TCB, followed by the addition of 0.5 mL of $C_6D_6$ and 2 to 3 drops of HMDS.

Following data acquisition, the chemical shifts are referenced to the signal of the internal standard HMDS, which is assigned a value of 2.03 ppm.

The comonomer content in polyethylene is determined by $^{13}$C-NMR analysis of pellets according to the method described by G. J. Ray et al. (Macromolecules, 1977, 10, (4), 773-778).

Crystallisation temperature (Tc) and Melting temperature (Tm) is determined according to ISO 11357-3:2018 on a DSC Q2000 instrument by TA Instruments. To erase the thermal history the samples are first heated to 220° C. and kept at 220° C. for 3 minutes. Then the polymer is cooled at −20° C./min. up to 20° C. and kept at 20° C. for 3 minutes. The crystallization temperature is determined during this cooling step. The crystallization temperature Tc corresponds to the temperature of the extremum of the spectrogram presenting the heat flux associated with the polymer as a function of the temperature during its cooling. The polymer is then melted up to 220° C. at 20° C./min. and the melting temperature is determined during this heating step. The melting temperature corresponds to the temperature of the extremum of the spectrogram presenting the heat flux associated with the polymer as a function of the temperature during its melting.

The density was measured according to the method of standard ISO 1183-1:2012 (immersion method) at a temperature of 23° C.

Thickness of the films was determined according to DIN ISO 4593:1993.

Mechanical properties of the films such as tensile strength at break, elongation at break, and E modulus were determined according to ASTM D 882.

Falling dart impact resistance was determined according to ASTM D1709, method A.

Thermal shrinkage was determined at a temperature of 100° C. during 5 minutes; sample size 100 mm×100 mm.

Haze was determined according to ASTM D 1003. Haze was measured on the final BOPE films: the thickness of these films is reported in Table 6.

Hot tack sealing properties were determined according to ASTM F1921/method B. with the following condition:

Sample width: 15 mm
Sealing time: 3 s
Sealing pressure: 0.3 N/mm$^2$
Traction speed: 200 mm/s

TREF

Temperature Rising Elution Fractionation analysis (TREF analysis) was performed using the method similar to as described in Soares and Hamielec, Polymer, 36 (10), 1995 1639-1654, incorporated herein in its entirety by reference. The TREF analysis was performed on a TREF model 200 TF series instrument equipped with Infrared detector from Polymer Char, (Valencia, Spain). The samples were dissolved in 1,2-dichlorobenzene at 150° C. for 1 h. The following parameters as shown in the below Table were used.

| METHOD INFORMATION | |
|---|---|
| Dissolution Rate(° C./min) | 20 |
| Stabilization Rate(° C./min) | 20 |
| Crystallization Rate 1(° C./min) | 0.5 |
| Elution Rate (° C./min) | 3 |
| Cleaning rate (° C./min) | 30 |
| Dissolution temperature (° C.) | 150 |
| Stabilization temperature (° C.) | 95 |
| Crystallization temperature (° C.) | 35 |
| Elution init temp (° C.) | 35 |
| Elution temperature (° C.) | 120 |
| Post elution temperature (° C.) | 150 |
| Cleaning temperature (° C.) | 150 |
| Dissolution time (min) | 60 |
| Stabilization time (min) | 45 |
| Crystallization time (min) | 10 |
| Pre-injection time (min) | 10 |
| Soluble Fraction time (min) | 10 |
| post elution time (min) | 10 |
| Cleaning time (min) | 30 |
| Cleaning cycles | 1 |
| High rpm | 200 |
| Low rpm | 100 |
| T on | 5 |
| T off (s) | 120 |
| Dissolution stirring | High |
| Stabilization stirring | High |
| Cleaning stirring | High |
| Filling vessels volume (mL) | 20 |
| Filling vessels pick up speed (mL/min) | 40 |
| Filling vessels pump speed (mL/min) | 15 |
| Analysis discarded sample volume (mL) | 2 |
| Analysis discarded waste volume (mL) | 6 |
| Analysis sample volume (mL) | 0.3 |
| Column load volume (mL) | 1.9 |
| Analysis waste volume (mL) | 5 |
| Analysis returned volume (mL) | 1 |
| Analysis pick up rate (mL/min) | 8 |
| Analysis dispensing rate (mL/min) | 3 |
| Cleaning volume (mL) | 30 |
| Cleaning pick up speed (mL/min) | 40 |
| Cleaning pump speed (mL/min) | 15 |
| Top oven temperature (° C.) | 140 |
| Pump Flow (mL/min) | 1.5 |

EXAMPLES

The following non-limiting examples illustrate the disclosure.

Selection of the Components of the Blend

- LLDPE1 was prepared according to the process disclosed in WO2020078932 for the inventive examples. LLDPE1 is metallocene-catalyzed. The comonomer is hexene and is present at about 8 wt. %
- HDPE1 is Lumicene® M5510EP (batch S106319328), commercially available at TotalEnergies
- HDPE2 is HD6207CC (batch H008E00380), commercially available at TotalEnergies
- HDPE3 is an experimental resin and is Ziegler-Natta catalyzed
- HDPE4 is an experimental resin and is Ziegler-Natta catalyzed The properties of the components of the blend are provided in the below table 1

TABLE 1

| | MI2 | Density | Mz | Mw | Mw/Mn |
|---|---|---|---|---|---|
| | | | unit | | |
| Resin | g/ 10 min | g/ $cm^3$ | g/mol | g/mol | |
| LLDPE1 | 1.62 | 0.916 | 243,734 | 85,620 | 4.5 |
| HDPE1 | 1.22 | 0.957 | 141,299 | 76,880 | 2.7 |
| HDPE2 | 0.69 | 0.962 | 706,958 | 126,362 | 5.8 |
| HDPE3 | 0.8 | 0.958 | 958,644 | 135,310 | 10.1 |
| HDPE4 | 0.83 | 0.954 | 848,033 | 126,241 | 9.6 |

The composition of the blends and the properties of the blends are provided in tables 2 to 4

TABLE 2

| | HDPE | Ratio (LLDPE/HDPE) | MI2 | Density |
|---|---|---|---|---|
| | | unit | | |
| Blend | | | g/ 10 min | g/ $cm^3$ |
| BLEND01 | HDPE1 | 80/20 | 1.38 | 0.925 |
| BLEND02 | HDPE2 | 80/20 | 1.27 | 0.926 |

BLEND01 and BLEND02 blend was extruded/compounded prior to the BOPE pilot trials to ensure an optimum homogeneity of the mixture

TABLE 3

| | Tm (° C.) (1) | Mw | Mz | Mw/Mn | Mz/Mw | Comonomer content |
|---|---|---|---|---|---|---|
| | | | | unit | | |
| blend | ° C. | g/mol | g/mol | | | wt % |
| BLEND01 | 124.1 | 84,230 | 207,604 | 3.9 | 2.5 | 7.3 |
| BLEND02 | 125.1 | 91,683 | 288,536 | 4.5 | 3.1 | 7.3 |

(1) The blends have multiple temperature peaks, the one reported here is the main melting temperature peak

TABLE 4

| | TREF results | | | |
|---|---|---|---|---|
| | Peak 1 | Peak 1 Area | Peak 2 | Peak 2 Area |
| | | unit | | |
| blend | ° C. | % | ° C. | % |
| BLEND01 | 76.1 | 72.9 | 102.6 | 25.3 |
| BLEND02 | 76.4 | 69.2 | 103.2 | 24.3 |

Multilayer Films

The 5-layer BOPE films have been produced according to a sequential stretching process (tenter frame technology). All the layers contained the same polyethylene composition. In a first step cast sheets were extruded with several extruders feeding the 5 layers ("DBABC") according to the below table 5.

TABLE 5

| Extruders | Layer | Final thickness after stretching |
|---|---|---|
| Main extruder (A) | A: core layer | ~17 μm |
| CoEx2 (B) | B: intermediate layers | ~1.5 μm |
| CoEx3 (C) | C: skin layer (chill roll side) | ~0.8 μm |
| CoEx4 (D) | D: skin layer (air knive side) | ~0.8 μm |

At the exit of the die, the coextruded sheets (about 1 mm thick) were cooled down on a chill roll that is partly immerged in a water bath.

In a second step, the cast sheets went through the MDO unit (machine direction orientation) wherein they were stretched along the direction of the machine through a system of heated rollers. Then the MD-stretched films entered the tenter (or "TDO oven"), an oven-like device which uses a chain to grip and stretch the film in a transverse direction on diverting rails. At the exit of the TD oven the films reached their final thickness (i.e., around 20 microns).

The properties of the BOPE-films are reported in table 6 with the stretch ratio in the machine direction (MDx) and in the transverse direction (TDx).

These thin BOPE films are characterised by an improved balance of properties in comparison with thicker, non-oriented PE blown films:

higher film stiffness and tensile strength at break despite lower thickness (tensile strength at break is typically in the range of 50 to 60 MPa for 40 microns blown films based on standard mPE with density 0.923-0.927);

similar to higher dart impact resistance despite lower thickness (dart is typically in the range of 200 to 310 grams for 40 microns blown films based on standard mPE with density 0.923-0.927);

similar to better transparency (haze is typically in the range of 5 to 8% for 40 microns blown films based on standard mPE with density 0.923-0.927).

Sealing properties of some of the BOPE films have been evaluated through hot tack sealing tests, in comparison with 40 microns thick PE blown film references (based either on commercial metallocene LLDPE with density 0.923, or on commercial LDPE with density 0.924). Regarding sealing initiation temperature (i.e. the minimum temperature at which a given seal strength is attained): considering a threshold of 0.2 to 0.5 N/15 mm, the inventive BOPE films exhibit a higher, or at least similar, sealing force in comparison with the reference blown films. It can also be seen that the BOPE films allow to reach a higher maximum seal strength (above 2.0 N/15 mm around 120° C.) than the reference blown films, with a relatively broad sealing window despite their lower thickness.

Figure 2:
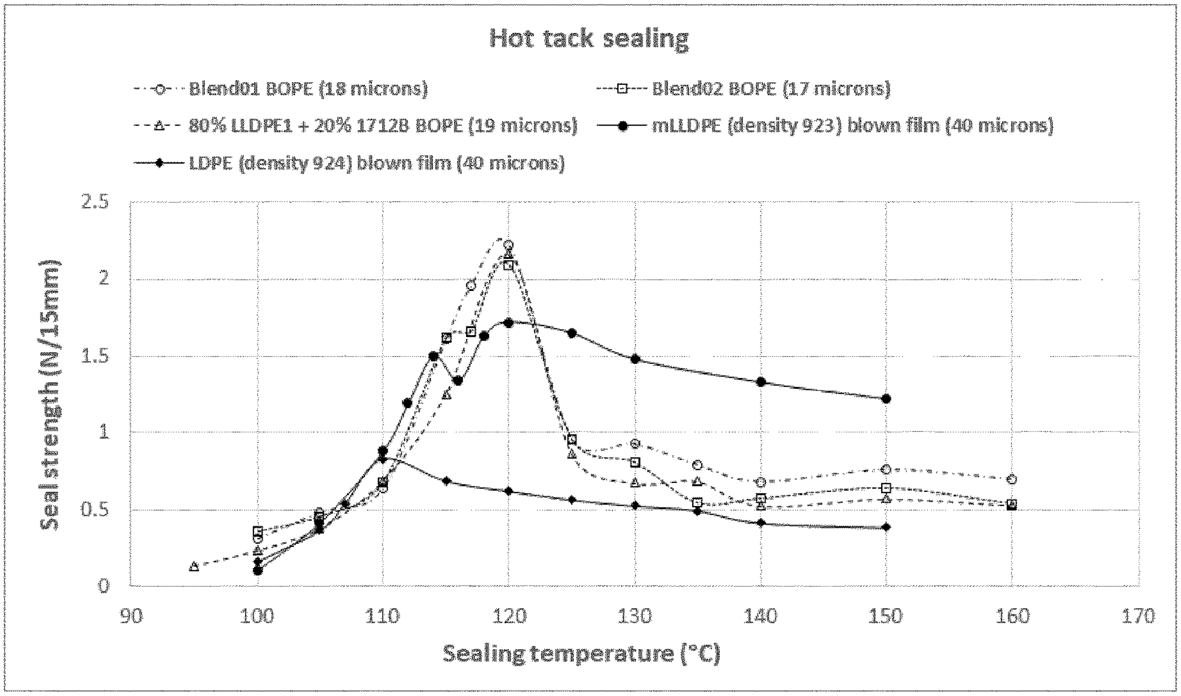
FIG. 2 represents the hot tack sealing properties.

Hot tack sealing properties are provided in FIG. 2.

In conclusion it can be considered that the inventive BOPE films exhibit an improved balance of properties (mechanical, optical and sealing) in comparison with thicker, non-oriented PE blown films.

TABLE 6

| Material | All 5 layers | | BLEND02 | | 80% LLDPE + 20% HDPE2 (1) | 70% LLDPE + 30% HDPE2 (1) | BLEND01 | 80% LLDPE + 20% HDPE1 (1) |
|---|---|---|---|---|---|---|---|---|
| MDx | | | 5.1 | 5.1 | 5.0 | 5.0 | 5.1 | 5.0 |
| TDX | | | 9.5 | ~9.5 | 8.5 | 8.5 | 7.9 | 8.5 |
| Thickness average | | μm | 18.1 | 17.0 | 20.5 | 20.0 | 17.7 | 19.5 |
| Tensile | MD | MPa | 103 | 89 | 83 | 68 | 102 | 93 |
| strength at break | TD | MPa | 147 | 152 | 113 | 92 | 169 | 98 |
| Elongation | MD | % | 278 | 279 | 323 | 328 | 264 | 289 |
| at break | TD | % | 121 | 131 | 135 | 177 | 113 | 146 |
| E-Modulus | MD | MPa | 229 | 242 | 268 | 337 | 241 | 249 |
| | TD | MPa | 343 | 342 | 438 | 471 | 336 | 349 |
| Haze | | % | 4.4 | 3.4 | 9.6 | 19.0 | 5.7 | 18.5 |
| Dart | | g | 344 | 361 | nd | nd | 335 | nd |
| Dart/thickness | | g/μm | 20.2 | 22.6 | nd | nd | 19.7 | nd |
| Shrinkage | MD | % | 6.7 | 6.0 | 6.0 | 4.3 | 6.9 | 6.7 |
| 100° C./5 min | TD | % | 10.6 | 8.8 | 8.0 | 7.3 | 12.4 | 8.5 |

| Material | 70% LLDPE + 30% HDPE1 (1) | 80% LLDPE + 20% HDPE3 (1) | 70% LLDPE + 30% HDPE3 (1) | 80% LLDPE + 20% HDPE4 (1) | 70% LLDPE + 30% HDPE4) (1) |
|---|---|---|---|---|---|
| MDx | 5.0 | 5.0 | 5.0 | 5.0 | 5.0 |
| TDX | 8.5 | 8.5 | 8.5 | 8.5 | 8.5 |
| Thickness average | 19.7 | 19.3 | 21.1 | 20.5 | 20.5 |
| Tensile | 97 | 103 | 107 | 94 | 108 |
| strength at break | 99 | 149 | 112 | 83 | 138 |
| Elongation | 300 | 233 | 225 | 217 | 238 |
| at break | 135 | 92 | 121 | 145 | 91 |
| E-Modulus | 263 | 265 | 298 | 186 | 265 |
| | 358 | 438 | 365 | 257 | 385 |
| Haze | 17.8 | 6.2 | 11.4 | 12.7 | 10.8 |
| Dart | nd | 270 | 307 | nd | nd |
| Dart/thickness | nd | 15.0 | 15.4 | nd | nd |
| Shrinkage | 4.8 | 7.7 | 6.6 | 7.5 | 6.3 |
| 100° C./5 min | 8.2 | 10.7 | 8.7 | 8.0 | 9.5 |

nd: not determined (1) the composition was not extruded/compounded prior to the BOPE pilot trials

The invention claimed is:

1. Process to produce a polyethylene composition for biaxially-oriented polyethylene film or mono-oriented polyethylene film, characterized in that it comprises:

providing from 60 to 90 wt. % of a linear low-density polyethylene resin based on the total weight of the polyethylene composition; wherein the linear low-density polyethylene resin has an MI2 ranging from 0.9 to 4.0 g/10 min as determined according to ISO 1133-2005 at 190° C. under a load of 2.16 kg; a density ranging from 0.910 to 0.930 g/cm$^3$ as determined according to ISO 1183-1:2012 at 23° C.; an Mw/Mn of at least 2.5 as determined by gel permeation chromatography; a z average molecular weight (Mz) of at most 310,000 g/mol as determined by gel permeation chromatography; and is a copolymer of ethylene and one or more comonomers wherein the one or more comonomers are present at a content ranging from 7.0 to 11.0 wt. % based on the linear low-density polyethylene resin;

providing from 10 to 40 wt. % of a high-density polyethylene resin based on the total weight of the polyethylene composition; wherein the high-density polyethylene resin has an MI2 ranging from 0.5 to 1.6 g/10 min as determined according to ISO 1133-2005 at 190° C. under a load of 2.16 kg; a density ranging from 0.950 to 0.965 g/cm$^3$ as determined according to ISO 1183-1:2012 at 23° C., wherein the high-density polyethylene resin is selected to have an MI2 that is below or equal to the MI2 of the linear low-density polyethylene resin; and melt-blending the linear low-density polyethylene resin and the high-density polyethylene resin to produce a polyethylene composition;

wherein the polyethylene composition has:

an MI2 ranging from 0.9 to 3.0 g/10 min as determined according to ISO 1133-2005 at 190° C. under a load of 2.16 kg;

a density ranging from 0.915 to 0.935 g/cm3 as determined according to ISO 1183-1:2012 at 23° C.;

an Mw/Mn ranging from 3.0 to 6.0 as determined by gel permeation chromatography;

a z average molecular weight (Mz) of at most 370,000 g/mol as determined by gel permeation chromatography;

a main elution peak below 82° C. and a secondary elution peak above 95° C. in a TREF profile; and a comonomer content ranging from 4.2 to 9.1 wt. % based on the total weight of the polyethylene composition as determined by $^{13}$C-NMR analysis.

2. The process according to claim 1 is characterized in that the polyethylene composition has an MI2 ranging from 1.0 to 2.6 g/10 min as determined according to ISO 1133-2005 at 190° C. under a load of 2.16 kg.

3. The process according to claim 1 is characterized in that the polyethylene composition has a density ranging from 0.920 to 0.935 g/cm$^3$ as determined according to ISO 1183-1:2012 at 23° C.

4. The process according to claim 1 is characterized in that the polyethylene composition has a comonomer content ranging from 4.9 to 8.5 wt. % based on the total weight of the polyethylene composition as determined by $^{13}$C-NMR analysis.

5. The process according to claim 1 is characterized in that the polyethylene composition has an Mw/Mn ranging from 3.2 to 5.8 as determined by gel permeation chromatography.

6. The process according to claim 1 is characterized in that the polyethylene composition has an Mz/Mw ranging from 2.0 to 5.0 as determined by gel permeation chromatography.

7. The process according to claim 1 is characterized in that the polyethylene composition has a z average molecular weight (Mz) of at most 350,000 g/mol as determined by gel permeation chromatography.

8. The process according to claim 1 is characterized in that the polyethylene composition has a main melting temperature peak Tm of at least 120° C. as determined according to ISO 11357-3:2018.

9. The process according to claim 1 is characterized in that the process comprises:

providing from 65 to 85 wt. % of the linear low-density polyethylene resin based on the total weight of the polyethylene composition; and/or providing from 15 to 35 wt. % of the high-density polyethylene resin based on the total weight of the polyethylene composition.

10. The process according to claim 1 is characterized in that the linear low-density polyethylene resin is a copolymer of ethylene and one or more comonomers selected from 1-butene, 1-hexene, and 1-octene.

11. The process according to claim 1 is characterized in that the linear low-density polyethylene resin is a copolymer of ethylene and one or more comonomers wherein the one or more comonomers are present at a content ranging from 7.5 to 9.5 wt. % based on the linear low-density polyethylene resin.

12. The process according to claim 1 is characterized in that the linear low-density polyethylene resin has a MI2 ranging from 1.0 to 3.5 g/10 min as determined according to ISO 1133-2005 at 190° C. under a load of 2.16 kg.

13. The process according to claim 1 is characterized in that the linear low-density polyethylene resin has a density ranging from 0.912 to 0.928 g/cm$^3$ as determined according to ISO 1183-1:2012 at 23° C.

14. The process according to claim 1 is characterized in that the linear low-density polyethylene resin has a Mw/Mn ranging from 3.5 to 6.0 as determined by gel permeation chromatography.

15. The process according to claim 1 is characterized in that the linear low-density polyethylene resin has a z average molecular weight (Mz) ranging from 180,000 to 280,000 g/mol as determined by gel permeation chromatography.

16. The process according to claim 1 is characterized in that the linear low-density polyethylene resin has a Mw of at most 110,000 g/mol as determined by gel permeation chromatography.

17. The process according to claim 1 is characterized in that the linear low-density polyethylene resin is metallocene-catalyzed and/or has a bimodal molecular weight distribution.

18. The process according to claim 1 is characterized in that the high-density polyethylene resin has:

an MI2 ranging from 0.6 to 1.5 g/10 min as determined according to ISO 1133-2005 at 190° C. under a load of 2.16 kg; or a density ranging from 0.952 to 0.964 g/cm$^3$ as determined according to ISO 1183-1:2012 at 23° C.

19. A polyethylene composition characterized in that it has:

an MI2 ranging from 0.9 to 3.0 g/10 min as determined according to ISO 1133-2005 at 190° C. under a load of 2.16 kg;

a density ranging from 0.915 to 0.935 g/cm$^3$ as determined according to ISO 1183-1:2012 at 23° C.;

an Mw/Mn ranging from 3.0 to 6.0 as determined by gel permeation chromatography;

a z average molecular weight (Mz) of at most 370,000 g/mol as determined by gel permeation chromatography;

a main elution peak below 82° C. and a secondary elution peak above 95° C. in a TREF profile; and a comonomer content ranging from 4.2 to 9.1 wt. % based on the total weight of the polyethylene composition as determined by $^{13}$C-NMR analysis.

20. A film being a single-layer film or a multi-layered film, characterized in that the layer or at least one of the layers is made of the polyethylene composition of claim 19 and in that, the film is a biaxially-oriented polyethylene film or a mono-oriented polyethylene film.

* * * * *